UNITED STATES PATENT OFFICE.

JAMES F. BARTLETT, OF MAYFAIR, ILLINOIS.

WATERPROOF ARTIFICIAL FUEL.

SPECIFICATION forming part of Letters Patent No. 712,635, dated November 4, 1902.

Application filed February 24, 1902. Serial No. 95,350. (No model.)

*To all whom it may concern:*

Be it known that I, JAMES F. BARTLETT, a citizen of the United States, residing at Mayfair, in the county of Cook and State of Illinois, have invented certain new and useful Improvements in Waterproof Artificial Fuel, of which the following is a specification.

This invention relates to improvements in a composition of matter to be used as fuel, and has for its object to provide a fuel which shall be inexpensive, substantially smokeless, and of great heat-producing power, and which shall be of such a character as to resist the action of the elements without becoming disintegrated or deleteriously affected thereby.

My composition consists of the following ingredients combined in about the proportion stated, viz: coal-dust, seventy-five per cent.; cow-manure, twenty-five per cent.; blood, two gallons; lime, two gallons; alum, four ounces; glue, two pounds; water, four gallons.

In preparing the composition I take the cow-manure and, if dry, pulverize it and thoroughly mix it with the coal-dust. The blood, lime, and alum are then thoroughly mixed and added to the water, in which the glue has been dissolved, after which the mixed coal-dust and cow-manure is added to the solution and mixed therewith. If the cow-manure is fresh or wet, it should be first mixed with the above-named solution of blood, lime, alum, glue, and water and then the coal-dust added thereto and thoroughly mixed therewith.

The above-stated quantities of the different ingredients will produce about a ton of the fuel, and after they have been thoroughly mixed, as above stated, the mass is then formed into lumps, blocks, or pieces and subjected to heat, so as to dry the same. The thus dried mixture will be odorless and non-smutting and impervious to water, and will resist the action of the elements, yet will be of a high inflammable yet durable nature, giving forth a large amount of heat units.

While I have found the above-named solution to be a good one for rendering the fuel weatherproof, as well as for adding other beneficial qualities thereto, yet I do not desire to be limited to the use of all the ingredients or to the proportions thereof above stated, as under certain conditions the amounts may be varied and some of the ingredients omitted. For instance, the blood and lime may both be omitted or either one of them may be used, or any other suitable weatherproof solution may be employed as a substitute for that above named without departing from the spirit of my invention.

Having thus fully described my invention, what I claim as new, and desire to secure by Letters Patent, is—

1. The herein-described composition of matter, consisting of coal-dust, cow-manure, blood, lime, alum, glue, and water, substantially as described.

2. The herein-described composition of matter consisting of seventy-five per cent. (75%) coal-dust, twenty-five per cent. (25%) cow-manure, two gallons of blood, two gallons of lime, four ounces of alum, two pounds of glue, and four gallons of water, substantially as described.

JAMES F. BARTLETT.

Witnesses:
CHAS. C. TILLMAN,
A. GUSTAFSON.